Dec. 20, 1960  J. W. JENSEN  2,964,816
HOLDING MEANS
Filed June 2, 1958  2 Sheets-Sheet 1
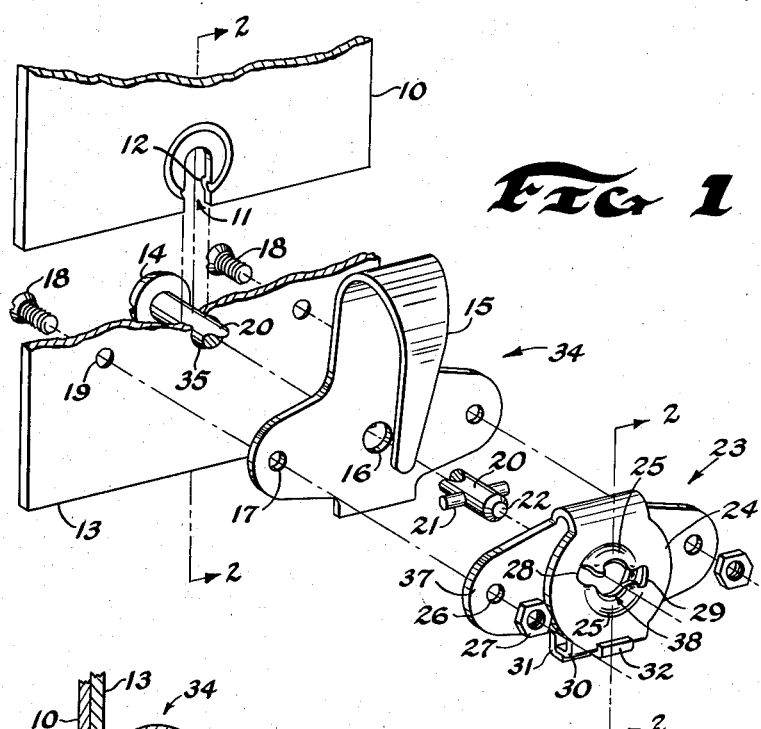
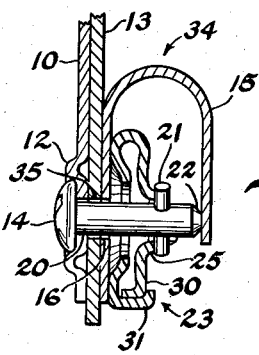
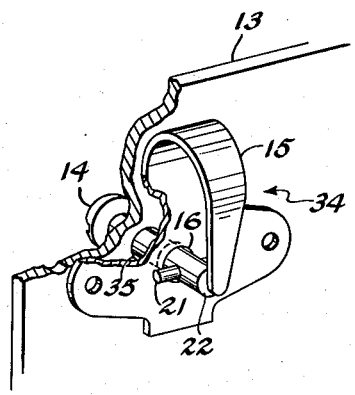
INVENTOR.
JOSEPH W. JENSEN
BY
ATTORNEY
AGENT Dec. 20, 1960 J. W. JENSEN 2,964,816
HOLDING MEANS Filed June 2, 1958

INVENTOR.
JOSEPH W. JENSEN
BY Marvin Moody
ATTORNEY
R W Anderson
AGENT

United States Patent Office 2,964,816
Patented Dec. 20, 1960

2,964,816
HOLDING MEANS

Joseph W. Jensen, Cedar Rapids, Iowa, assignor to Collins Radio Company, Cedar Rapids, Iowa, a corporation of Iowa Filed June 2, 1958, Ser. No. 740,989

5 Claims. (Cl. 24—221)

This invention relates generally to holding means and more particularly to a means of plate fastening by which two plates may be clamped together so as to prevent relative motion therebetween.

The holding means of the present invention is of the type employing a cam actuated stud having a retaining head surface on one end thereof. By rotation of the stud, the camming means urges the stud inwardly with respect to one plate member such that a second plate member, having retaining means which cooperate with the head of said stud, is firmly clamped to the first plate.

The camming means and the stud of this invention and the cooperative action therebetween may be of the type described, for example, in Patent No. 2,314,368 to O. J. Poupitch. In prior art devices of this type, however, the camming means have been associated with one of the two plates, while the stud and its cooperative camming arrangement have been retainably secured in the second plate. These devices have become widely used in applications such as in cowl fastening wherein a first sheet metal member is to be placed over a second sheet metal member and clamped thereto by the stud fastening device.

It ofttimes becomes desirable to clamp two plate members such that prior to the clamping operation per se one of the plate members may be moved laterally into position with respect to the second, such as, for example, a sheet metal box and cover arrangement wherein the cover has a turned-down flange which is slideably positioned over the outside walls of the container. Known quick-lock devices, as described in the afore-mentioned patent, are applicable only in cases wherein one plate member is to be placed over the second to align the stud with an aperture in the plate upon which the stud camming means is affixed. In these prior art applications, the plate which is to be fastened into position has the stud member projecting therefrom and lateral motion between the two plate surfaces is not possible.

It is an object of the present invention, therefore, to provide a plate holding means of the type incorporating a locking stud in cooperation with a camming means wherein rotation of the stud produces motion of the stud axis normal to the plate surfaces and further provides a cooperating retaining means in one of the plates such that the head of the stud member, as it is drawn inwardly, affects the desired clamping action between the two plates. It is a further object of the present invention to provide a plate holding or fastening means permitting the plates to be juxtaposed and one of the plates to be slideably positioned to align the retaining means with the head of the stud member which is retained in the other plate. In a preferred embodiment, the invention features an embossed annular ring formed into a first plate and formed concentrically about an aperture to receive the shank of the stud member while having a slot communicating with the aperture to enable the plate to slideably receive the shank portion of the stud member.

These and other objects and features of the invention will become apparent from reading the following description with reference to the accompanying drawings, in which:

Figure 1 is an exploded isometric view of the plate holding means of the invention;

Figure 2 is a cross section of the plate holding means taken through line 2—2 of Figure 1;

Figure 3 is an isometric cutaway portion with a partial assembly of the present invention;

Figure 4:
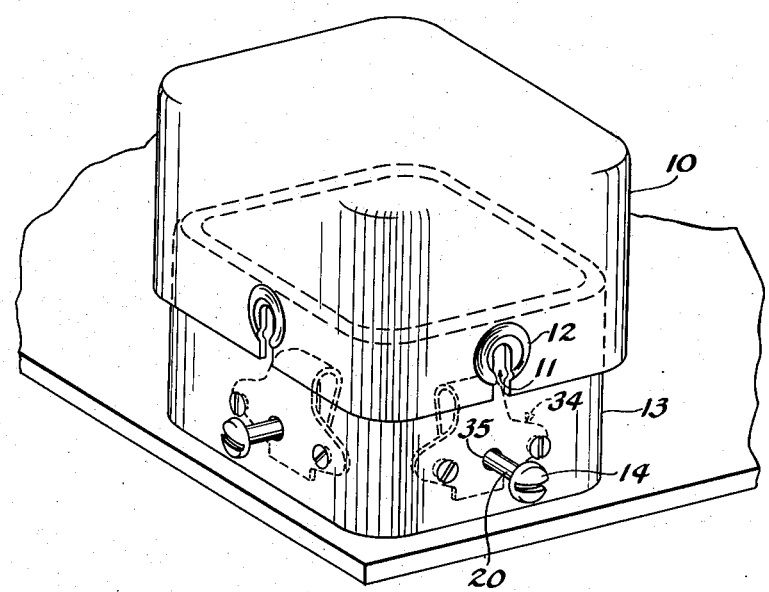
Figure 4 illustrates an application of the holding means of the present invention in conjunction with a can and cover arrangement.

The present invention is illustrated in the exploded form of Figure 1 and shows a first plate 13 upon which a second plate 10 may be slideably received and locked into position. Figure 2 illustrates the arrangement in locked position with the two plates 10 and 13 clamped by the cooperation between the head 14 of the stud member and a transverse pin 21 through the stud member which is in engagement with a stud camming means generally designated by reference numeral 23. With particular reference to Figure 1, the stud member of this invention is seen to be comprised of a shank portion 20 having a head portion 14 of enlarged diameter on one end and a pin member 21 placed through the shank portion 20 near the end 22. The shank portion 20 of the stud is slideably and rotatably received in aperture 35 formed in the first plate 13. The stud member is thus retained in the first plate 13 once the transverse pin 21 is placed through the shank 20. Plate 13 has rigidly attached thereto a camming means generally designated by reference numeral 23. Camming means 23 is seen to be comprised of a portion 24 which is an extension of the base 37 which has been turned over to place it in a substantially space-separated parallel relationship with the base 37. There is thus a degree of resiliency effected between the projection 24 and the base 37 of the camming member 23. The base member 37 has a second projection 31 formed with a tab-like projection 32 which confines the projection 24 with respect to the base 37. Projection 24 further has tab-like projection 30 on the bottom portion which cooperates with the projecting tab 31 on the base such that a degree of resiliency is retained and yet collapse between the projection and the base is prevented. Projection 24 of camming member 23 is provided with a central aperture 38. Embossed camming surfaces 25 are formed concentrically about the aperture 38 and diametrical slots 28 and 29 communicate with aperture 38 such that the pin member 21 and end 22 of the stud member may be received by the camming arrangement. In assembly, as illustrated in Figure 2, a spring member, generally designated by reference numeral 34, has a projection 15 which cooperates with the end 22 of the stud member so as to constantly urge the stud member outwardly with respect to plates 10 and 13. As previously referenced, the camming arrangement in conjunction with the stud member and its transverse pin 21 cooperate in a known manner whereby, by partial rotation of the stud member, the stud is urged inwardly with respect to the two plates by the action of pin member 21 in cooperation with camming surfaces 25 on camming member 23. Spring member 34 serves a dual purpose of ensuring a positive loading of pin 21 on the cam surfaces 25 and, with the stud in its unlocked position, further urges the stud outwardly such that the head member 14 is clear of the surface of plate 10. In the embodiment illustrated, spring member 34 and camming member 23 are assembled in order and affixed to plate 13 by any known expedient. As illustrated, for example, screws 18 may be employed to pass through holes 19, 17 and 26 respectively in the members and secured by means of nuts 27. The spring member in this particular embodiment is illustrated as having an aperture 16 similar to aperture 35 in plate 13 which receives the shank portion 20 of the locking stud.

In assembly of the particular embodiment illustrated, the stud would be inserted through apertures 35 and 16 and the pin 21 then placed through shank 20, thus retaining the stud member in the assembled relationship. The retention of the stud in the plate 13 is illustrated in Figure 3 which shows the spring member 34 in position on plate 13 and the stud inserted with the pin 21 in place such that the stud is retained in the assembly by the head portion 14 and the transverse pin 21. Figure 3 further illustrates the cooperation between the projection 15 on spring member 34 which loads against the end 22 of the stud member such as to continually urge the head member 14 outwardly with respect to plate 13.

The mechanical elements of the present invention are seen to be affixed to one of the two plates, the spring member 34 and camming member 23 being rigidly affixed to plate 13 and the stud member being retainably received in the assembly. Now with the reference to Figure 1, the second plate 10 is illustrated as being laterally displaced with respect to and in parallel juxtaposition with plate 13. In the preferred embodiment illustrated, plate 10 is formed with an embossed annular ring 12 raised upon the outside surface of plate 10. This is illustrated in cross section of Figure 2. The slot 11 is formed inwardly from the edge of plate 10 to communicate with the embossed ring 12 such that plate 10 may be slideably positioned on plate 13 with the shank 20 of the locking stud being received in the slot 11 and the head portion 14 of the locking stud concentrically positioned within the embossed annular ring 12. It is thus seen that upon partial rotation of the locking stud, the stud will be urged inwardly due to the action of transverse pin 21 on camming surfaces 25 to seat the head portion 14 of the stud within the annular ring 12. Figure 2 illustrates the assembled and locked cooperation between the elements and it is seen that lateral motion between plates 10 and 13 is prevented, while the plates 10 and 13 are held in clamped position.

Figure 5:
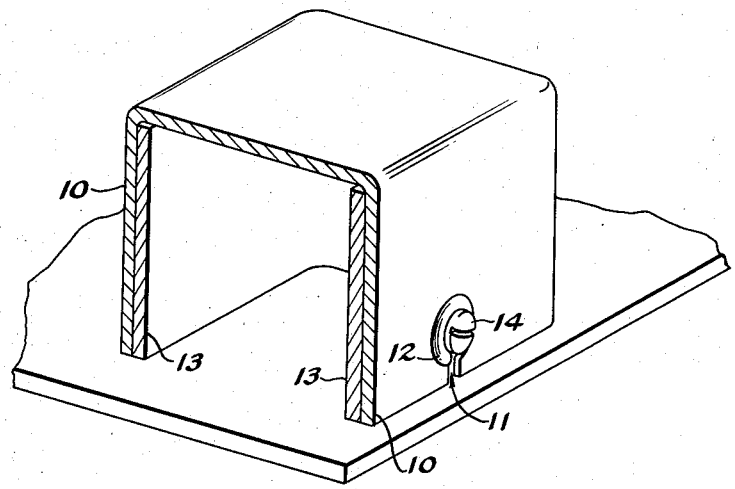
Figure 5 further illustrates the arrangement of Figure 4 with can and cover in finalized locked position.

As previously described, the plate holding means of the present invention finds especial use in applications wherein a cover is to be slideably received over a container and firmly locked into position clamping the sides of the cover to the container and preventing lateral motion therebetween. Figure 4 illustrates such an arrangement wherein the container is designated by reference numeral 13 in correspondence to plate 13 in Figure 1 and the cover 10 corresponds to the plate 10 of Figure 1. Container 13 is provided with the camming and spring loading arrangement of this invention on its inside surface, spring member 34 being illustrated by dotted line construction. The locking stud is illustrated in its unlocked position with the shank 20 protruding from aperture 35 in container 13 such that the head portion 14, by the action of spring member 34, is urged outwardly from the surface of container 13. Cover member 10 is shown formed with the embossed annular ring 12 previously described, with the communicating slot 11 positioned such that it may receive the shank portion 20 of the locking stud. Figure 5 illustrates the cover 10 in its finalized position with the holding means in its locked position such that the head member 14 is seated within annular ring 12 to prevent lateral motion between the cover 10 and container 13.

The present invention has been described with the slotted embossed annular ring 12 in plate 10 as a preferred arrangement. It is to be realized, however, that bosses other than annular ring 12 may be placed in co-operating circumferential engagement with the stud head 14 and that other arrangements may be provided on plate 10 to realize the desired cooperation with the stud head 14. For example, the embossed retaining means need not be included, with lateral motion between the plates restricted by frictional engagement only. Further, plate 10 might be provided with an overlay plate having formed therein an aperture within which the head 14 of the locking stud may be received and through which the communicating slot is extended. Alternatively, the head of the locking stud might be formed as a frusto-conical configuration and the plate 10 formed with a mating frusto-conical depression terminating in an aperture in which the shank portion of the locking stud is received and with which the slot 11 communicates. The latter arrangements would similarly provide means to retain the head 14 with respect to the plate 10 and prevent lateral motion therebetween upon locking the stud member.

Although this invention has been described with respect to a particular embodiment thereof, it is not to be so limited as changes and modifications may be made therein which are within the full intended scope of the invention as defined by the appended claims.

I claim:

1. Fastening means for clamping first and second plates comprising a locking stud rotatably received in an aperture in said first plate, camming means mounted on said first plate concentrically about said stud member, said stud having a shank portion with an enlarged diameter head portion on one end thereof and a transverse pin through the shank portion thereof whereby said stud is slidably retained in said first plate, said transverse pin cooperatively engaging with said camming means to impart axial translation of said stud upon rotation of said stud, said second plate having formed therein an aperture and communicating slot to receive the shank portion of said locking stud, whereby the stud head may be drawn inwardly toward said second plate surface and a clamp effected therebetween.

2. Fastening means for clamping first and second plates comprising a locking stud rotatably received in an aperture in said first plate, camming means mounted on said first plate concentrically about said stud member, said stud having a shank portion with an enlarged diameter head portion on one end thereof and a transverse pin through the other end thereof whereby said stud is slidably retained in said first plate, said transverse pin cooperatively engaging with said camming means to impart axial translation of said stud upon rotation of said stud, said second plate having formed therein an aperture with communicating slot to receive the shank portion of said locking stud and said second plate including retaining means on the surface thereof to receive the head portion of said stud whereby with the stud head drawn inwardly toward said second plate surface, lateral motion between said stud head and said plate surface is prevented.

3. Fastening means for clamping first and second plates comprising a locking stud member having a shank portion and an enlarged diameter head portion, an aperture formed in said first plate for rotatably receiving the shank portion of said locking stud, camming means mounted on said first plate concentrically about said first plate aperture, a pin member received laterally through the shank portion of said locking stud whereby said stud member is slidably retained in said first plate, said pin member cooperatively engaging with said camming means whereby rotation of said stud imparts motion thereof normal to the surfaces of said first plate, said second plate formed with an aperture therein, a slot formed from the edge of said second plate and communicating with said second plate aperture, and retaining means associated with the surface of said second plate in a predetermined relationship with said second plate aperture whereby lateral motion between the head portion of said locking stud and said second plate surface is prevented when the head portion of said locking stud is withdrawn into engagement with said second plate surface.

4. Fastening means for clamping first and second plates comprising radial camming means connected to the surface of said first plate and formed with a central aperture therethrough to rotatably receive the shank portion of a locking stud member, said stud member rotatably received in a like aperture in said first plate and having an enlarged diameter head portion formed on one end of the shank portion thereof and a pin member extending transversely through the shank portion thereof whereby said stud member is slidably retained in said first plate, said pin member being cooperatively engageable with said camming means to impart axial displacement of said stud member with respect thereto upon rotation of said stud member, said second plate formed with a stud head retaining means on the surface thereof and an aperture to receive the shank of said stud, a slot permitting slideable engagement with said stud shank communicating with said aperture, whereby said second plate may be slideably positioned on said first plate to seat said stud shank in said second plate aperture and said stud rotated to withdraw said head portion thereof for retaining engagement between the head portion of said stud and said stud head retaining means.

5. Fastening means for clamping first and second plates comprising radial camming means connected to the surface of said first plate and formed with a central aperture therethrough to rotatably receive the shank portion of a locking stud member, said stud member rotatably received and slideably retained in an aperture in said first plate by having an enlarged diameter head portion formed on one end thereof and a pin member extending transversely through the shank portion thereof, said pin member engageable with said camming means to impart axial displacement of said stud member upon rotation of said stud member, said second plate formed with an aperture to receive the shank of said stud, a slot permitting slideable engagement with said stud shank communicating with said second plate aperture and stud head retaining means embossed on the surface of said second plate in circumferential juxtaposition with said stud head, whereby said second plate may be slideably positioned on said first plate to seat said stud shank in said second plate aperture and said stud rotated to withdraw said head portion thereof for retaining engagement between the head portion of said stud and said stud head retaining means.

References Cited in the file of this patent
UNITED STATES PATENTS

| | | |
|---|---|---|
| 1,800,715 | Clausen | Apr. 14, 1931 |
| 2,279,343 | Reeser | Apr. 14, 1942 |
| 2,641,814 | Hartman | June 16, 1953 |
| 2,684,516 | Zahodiakin | July 27, 1954 |